Nov. 19, 1940.                G. M. BUCHANAN                2,222,019
                    CONVEYER OF THE ENDLESS BELT TYPE
                Filed Nov. 4, 1939            3 Sheets-Sheet 3
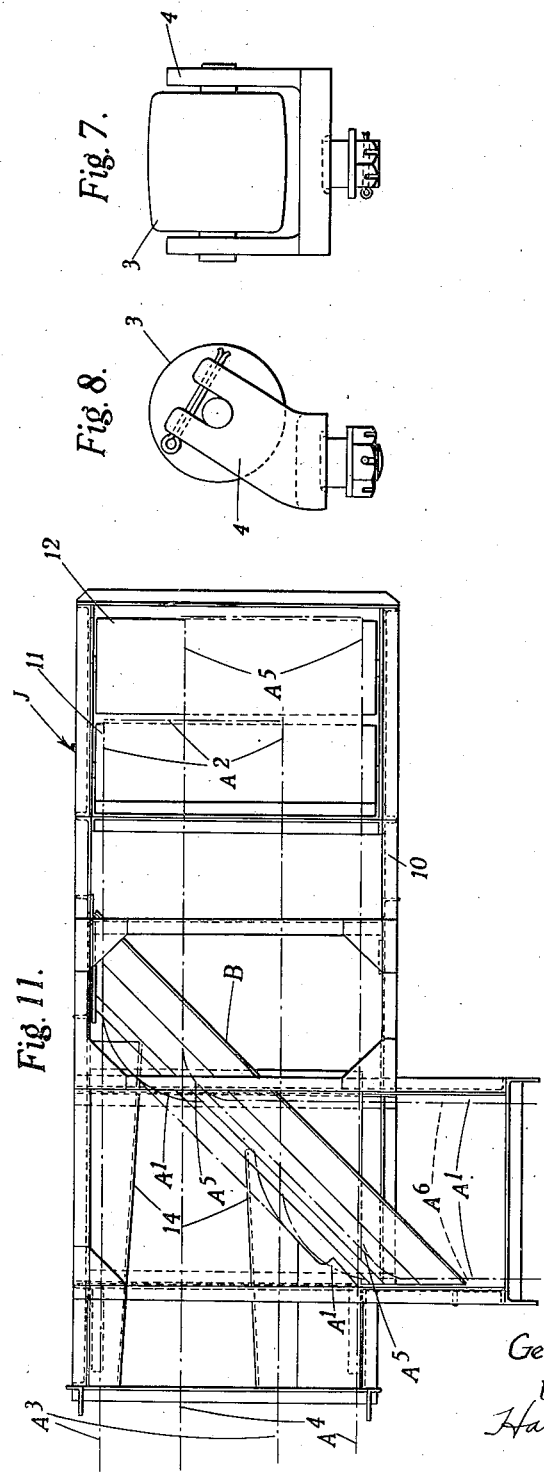
Inventor
George M. Buchanan
by
Harold W Hawkins
his Attorney Patented Nov. 19, 1940

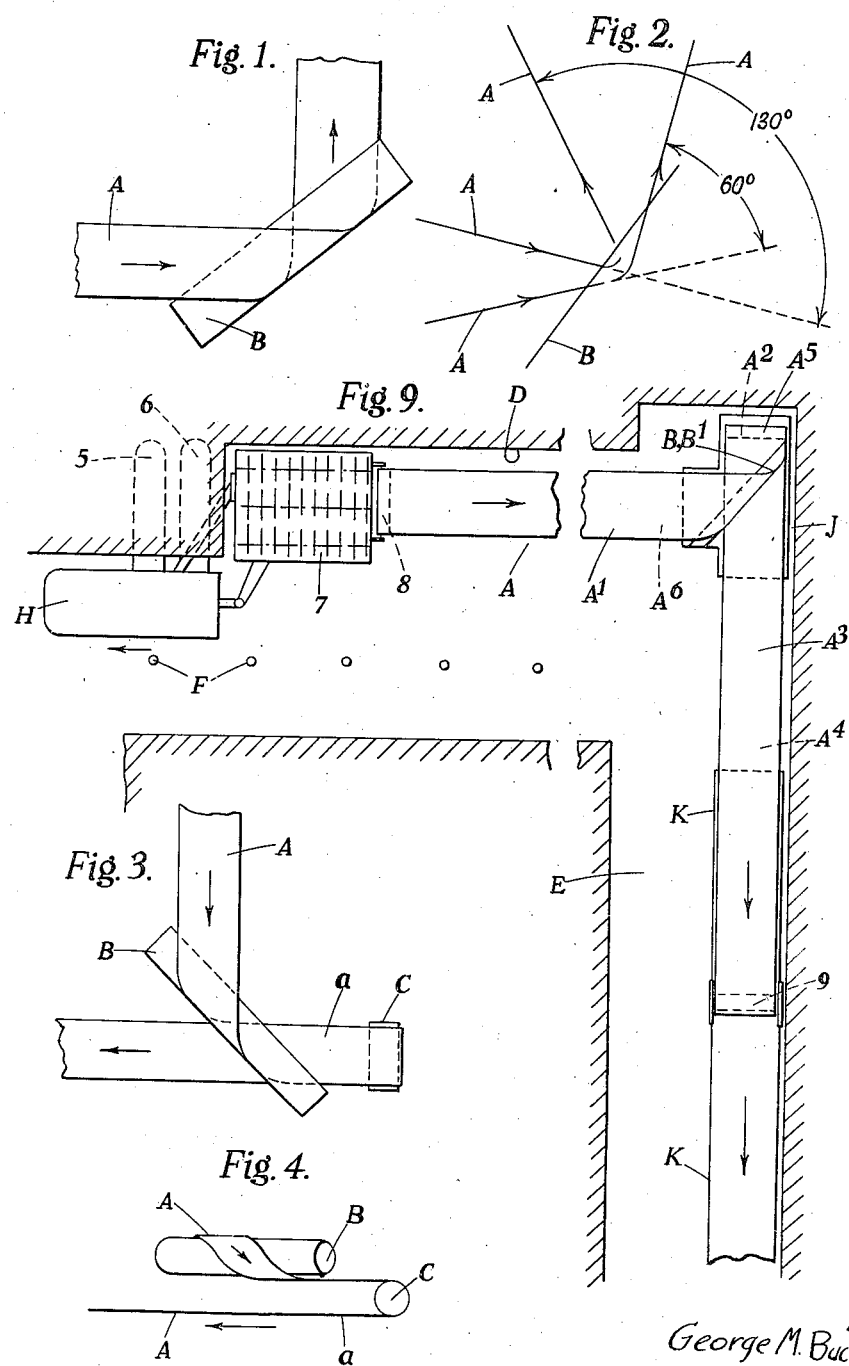

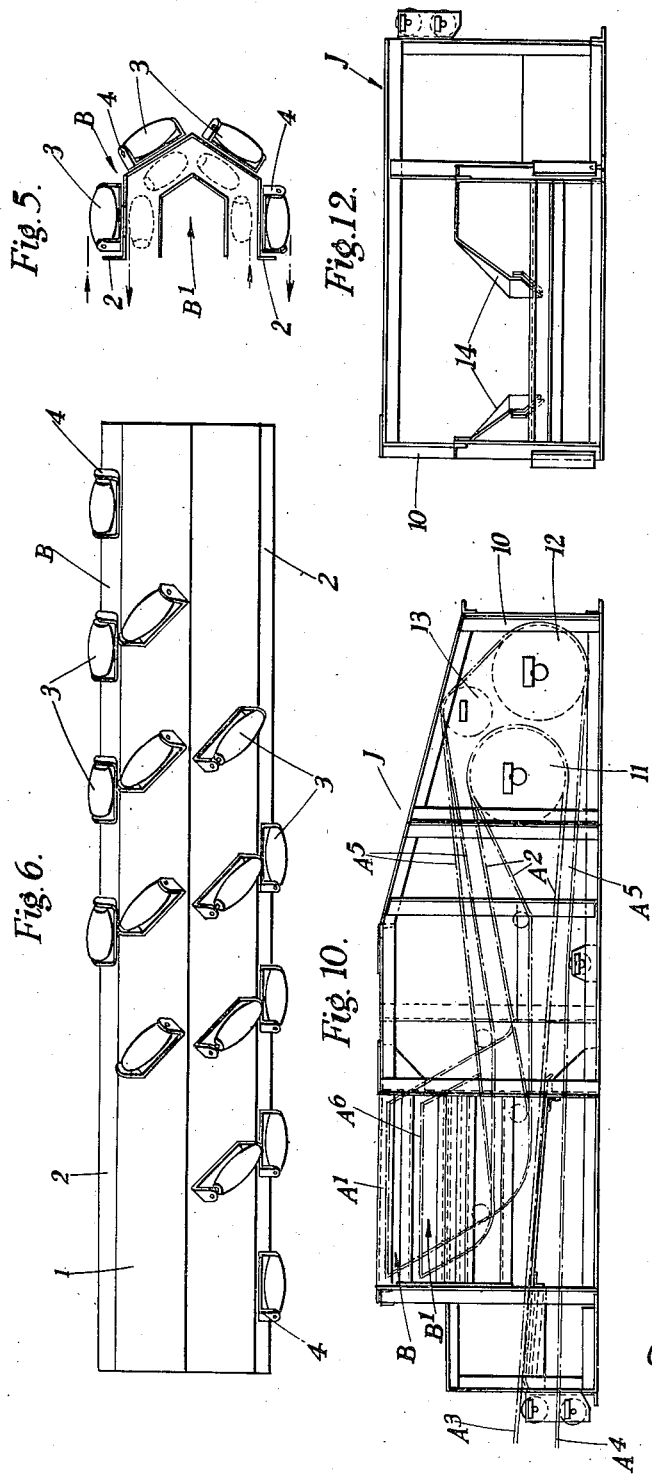

2,222,019

UNITED STATES PATENT OFFICE 2,222,019

CONVEYER OF THE ENDLESS BELT TYPE

George Macdonald Buchanan, Glasgow, Scotland, assignor to Mavor and Coulson, Limited, Glasgow, Scotland Application November 4, 1939, Serial No. 302,905
In Great Britain October 31, 1938

7 Claims. (Cl. 198—184)

This invention refers to conveyers of the endless belt type, particularly, but not exclusively, conveyers for use underground in mines, i. e. conveyers adapted to be extended or contracted as required by the addition or removal of belt supporting units and lengthening or shortening of the belt.

In the ordinary belt conveyer, the direction of travel of the belt is changed where required by means of rollers or drums each of which is rotatable about an axis at right angles to the direction of travel of the belt running on to and running off the roller. In other words, the centre line of the belt leaving the drum requires to lie in the same plane at right angles to the axis of the drum as the centre line of the belt reaching the drum. By forming the belting into a scroll or helix it is, however, possible to change the direction of travel of the belting without such limitation on the relative directions of the belt before and after change of direction.

The use of stationary guides for this purpose is not practicable because of excessive friction. It will be appreciated also that, with the belting in the tensioned condition normal in belt conveyers, to form the scroll or helix on a guide which is simply a rotatable roller or drum equal in diameter to the diameter of the helix to be formed would give rise to an undesirable amount of friction between the belt and the drum since the linear movement of the belt on the drum would be oblique to the linear movement of the surface of the drum.

In the case of a conveyer belt which is of considerable breadth and subject to heavy loading and driving tension, as in conveyers for mining use, it is a matter of difficulty to provide a satisfactory form of guide which will approximate to a true helical or scroll form and which in its dimensions will bear somewhat the same relationship to the width of the belt as do the rollers or drums ordinarily used in belt conveyers.

In accordance with the invention, for changing the direction of travel of conveyer belting by forming the belting into a scroll or helix by passage round a guide, a guide is provided comprising a series of idler rolling members of small diameter relative to the diameter of the scroll, for example, rollers, mounted so as to define substantially a cylindrical or helical surface equal in diameter to that of the scroll and each independently rotatable about an axis approximately normal to the direction of movement of the belt as it passes over the rolling member and short in axial length relative to the breadth of the belt.

In this way a practically unlimited variety of relative directions of belt travel is made possible.

The use of a guide or guides of this construction opens up a wide variety of conveyer arrangements for material such as coal. In a conveyer having a guide in accordance with this invention, material under conveyance on the belt may remain on the belt until it reaches the guide, and then be discharged gravitationally as the belt passes over the guide. The arrangement may be such that continuance of conveyance of the material by the belting after change of direction is provided for by the material being transferred from the belting, as the belting passes over the guide, on to the belting after the latter has passed the guide. For this purpose the belting after leaving the guide may be formed into a loop and brought back under the guide in the required direction so as to be in a position to receive material thrown off in passing over the guide and thus to resume conveyance of the material.

In coal mining, coal mined at the coal face may be loaded on to a face conveyer which conveys it to a gate road extending approximately at right angles to the coal face, along which gate road the coal is conveyed to a main road. The present invention may be applied to these conditions, a conveyer being provided comprising a single endless belt circuit arranged to form a first part with conveying and return runs extending along the coal face and a second part with conveying and return runs at the required angle to the first part extending along the gate road the two parts acting, respectively, to convey material along the coal face to the gate road and to convey the coal along the gate road away from the coal face, and contraction or extension of the one part providing for extension or contraction of the other part.

The invention will now be described with reference to the accompanying drawings, in which:

Figures 1, 2, 3 and 4 are diagrams illustrating the general principle of the invention.

Figure 5 is an end elevation, Figure 6 is a front elevation, and Figures 7 and 8 are detail views, illustrating one example of construction of scroll guide.

Figure 9 is a plan view showing the use of a conveyer in accordance with the invention in a coal mine.

Figure 10 is a side elevation, Figure 11 is a plan view, and Figure 12 is an end elevation showing a construction of guide unit for use in the apparatus shown in Figure 9.

Figure 1 of the drawings shows diagrammatically the method of changing the direction of a conveyer belt in scroll fashion. The belt is denoted by A and a scroll guide by B, the latter being assumed to be a cylinder with its axis horizontal and at 45° to the direction of travel of the belt. In passing over and under the guide B, the belt A is formed into a 180° scroll or helix, and its direction of travel is turned through 90° in the horizontal direction. A change of direction of from about 60° up to about 130° can be effected, see Figure 2.

It will be understood with regard to Figure 1 that material on the belt A as it reaches the guide B will be thrown off.

Figures 3 and 4 show the use of a scroll guide to change the direction of travel of the belt of a belt conveyer through 90° with continuance of conveyance of the material after change of direction. The guide B is arranged as in Figure 1, but the belt A after leaving the under side of the guide B is formed into a loop $a$ by passage over and under a roller or drum C, and is brought back at a lower level beneath the guide B. The material thrown off the belt A as the belt passes over the guide B falls on to the belt again as the belt emerges from the loop $a$ and is carried away by that run of the belt. Figure 4 shows the belt passing over and under the guide B, forming the loop, and then passing away at right angles to the belt approaching the guide B.

As already stated, a scroll guide in accordance with the invention may comprise a series of idler rolling members. When a belt assumes a scroll or helical form, the belt at any section transverse to its length is not plane but is convex or cambered to a considerable degree outwardly from the axis of the guide. This will be appreciated from consideration of the shape of the surface contour of a cylindrical body on a helical line or section. Oblique idler rollers, each extending the full width of the belt, cannot in practice be made to offer the required convex line of support to the belt, but by the use of rolling members each of which is short axially in comparison with the width of the belt, as shown in Figures 5, 6 and 7, the desired condition can be approximated to.

Referring to Figures 5, 6, 7, and 8, the scroll guide B shown comprises a support $1$ consisting of a plate bent into the foursided form shown, with upper and lower flanges $2$. A series of short cambered rollers $3$ are mounted on the support $1$, so that they define a helical path, see Figure 6. Each roller $3$ is carried in a forked bearing $4$ as shown in Figures 7 and 8. The roller bearing $4$ is of the cranked form shown and is free to turn relative to the support $1$ on which it is mounted. The roller $3$ and bearing $4$ thus constitute a castor capable of taking up the natural and correct position for the direction of travel of the belt.

In Figure 5 a second guide $B^1$ is shown within the guide B, arranged co-axially with the latter and of substantially the same construction. The purpose of such co-axial scroll guides will be hereinafter explained.

Instead of short rollers, balls capable of universal rotation may be used.

Referring now to Figure 9, this shows a coal face D, gate road E at right angles to the coal face, props F supporting the roof, a coal cutting machine H, and a belt conveyer A comprising a single belt circuit with two parts, viz. a coal face part and a gate road part.

The mining machine is of the cutter-loader type such as illustrated in specification of British Patent No. 493,946, and comprises an undercutting jib $5$ and an overcutting jib $6$, with a loader $7$ attached to the machine H behind the cutter jibs. As the machine progresses along the coal face, the coal breaks down and is picked up by the loader $7$.

Mounted on the rear of the loader $7$ there is a drum $8$, which forms part of the conveyer structure. At the junction of the coal face and the gate road there is a scroll guide unit J for the guidance of the conveyer belt. The belt circuit is as follows:

Starting from the roller $8$, the upper or conveying face run $A^1$ extends to the unit J where the belt passes over and under a scroll guide B in the manner shown in Figure 2. A loop $A^2$ of belting, corresponding with the loop $a$ of Figures 3 and 4, is formed, and thereafter the belt extends outwards in the run $A^3$ along the gate road E to a return drum $9$ which forms part of a belt driving gear. From the drum $9$ the belt extends inwardly as the run $A^4$ underneath the run $A^3$ to beyond the guide B where a second loop $A^5$ is formed around the loop $A^2$, as will be more fully described later. Emerging from the loop $A^5$ the belt passes under and over a scroll guide $B^1$, as in Figure 5, within and co-axial with the guide B, and from there extends as the return face run $A^6$ back to the roller $8$.

Figures 10, 11 and 12 show the guide unit arrangement in detail. This unit J comprises a structure $10$ supporting co-axial scroll guides B and $B^1$, and drums $11$, $12$ and $13$. The upper face run $A^1$ of the belt A enters the unit J and passes over and under the outside guide B, then to the right in Figures 10 and 11 to form the loop $A^2$ over and under the drum $11$ and back under the guide B. Thence the run $A^3$ extends outwards along the gate road. The return gate road run $A^4$ comes into the unit J below the run $A^3$ from the left in Figures 10 and 11, and is formed into the loop $A^5$ by passage round the drums $12$ and $13$ and then to the inner guide $B^1$, under and over which it passes in scroll fashion. From the guide $B^1$ the belt extends as the return face run $A^6$ back along the face under the run $A^1$ to the drum $8$.

In operation, coal mined at the coal face is loaded by the loader $7$ on to the run $A^1$ of the belt, and where the belt passes over the outside guide B the coal is thrown off and falls between guide plates $14$ on to the outgoing run $A^3$ in the gate road for conveyance to the surface.

A second and separate gate road conveyer K is provided, on to which the conveyer A discharges at $9$. As the coal cutting machine moves along the coal face, it extends the face part of the conveyer A behind it, for which purpose it draws belting from and reduces the gate road part, the driving gear at $9$ in the gate road being moved up the gate road as the machine operates. This movement of the driving gear is allowed for by the overlap of the conveyers A and K, see Figure 9. The driving gear is movable on the framework of the conveyer A or else is movable on the floor, spanning the conveyer K.

The advantage of this method of conveyer working is that the conveyer can be loaded without obstruction by props. In the usual method of working, the face conveyer extends along the goaf side of the machine and a line of props comes between it and the face.

Instead of using a separate conveyer such as K in the gate road, a loop of belting may be formed in the lower run A⁴ of the conveyer A in the manner described in British Patent Specification No. 330,700, to provide for extension of the face part of the conveyer A.

The lower run of the belting may be used for conveyance of material instead of or in addition to the upper run.

In the foregoing description, it has been assumed in general that a scroll of 180° is formed. A scroll of other angle may be formed, for example, of 360° so that the belt leaves the scroll guide in a direction parallel to but offset laterally from the direction in which it reaches the guide. For this purpose the helical path provided by the small rollers, see Figure 6, is extended to 360°.

I claim:

1. A conveyer including an endless conveyer belt and a guide member of cylindrical contour round which the belt runs and which lies with its axis oblique to the direction of travel of the belt passing on to it, with the belt formed into a scroll or helix on the guide member, whereby the direction of travel of the belt is changed, the guide member comprising a mounting and a series of idler rolling members supported on the mounting to provide a substantially helical path for the belt, each rolling member being independently free to rotate about an axis of its own normal to the direction of the belt passing over it and being small in diameter relative to the diameter of the scroll and short in axial length relative to the breadth of the belt, a plurality of such rolling members contributing to make up the breadth of the belt path.

2. A conveyer including an endless conveyer belt, a guide member of cylindrical contour round which the belt runs and which lies with its axis horizontal and oblique to the direction of travel of the belt as it passes horizontally on to the guide member, with the belt formed into a scroll or helix on the guide member, whereby its direction of travel is changed, the guide member comprising a mounting and a series of idler rolling members supported on the mounting to provide a substantially helical path for the belt, each rolling member being independently free to rotate about an axis of its own normal to the direction of the belt passing over it and being small in diameter relative to the diameter of the scroll and short in axial length relative to the breadth of the belt, a plurality of such rolling members contributing to make up the breadth of the belt path, the conveyer also including a drum arrangement rotatable about its own axis over and under which the belt leaving the guide member is trained and whence the belt is brought back below the guide member to receive material under conveyance thrown off the belt as it passes over the guide member.

3. A conveyer including an endless conveyer belt formed by rotatable drums at its terminal positions into upper and lower runs, and two guide members of cylindrical contour intermediate between the terminal positions and arranged at different levels with their axes parallel and oblique to the direction of travel of the belt passing on to them, the upper run of the belt forming a scroll or helix on the first of the two guide members to change its direction of travel, and the lower run of the belt forming a scroll or helix on the second of the two guide members, the direction of travel of both runs being changed thereby through the same angle and at corresponding positions in the runs, each guide member comprising a mounting and a series of idler rolling members supported on the mounting to provide a substantially helical path for the belt, each rolling member being independently free to rotate about an axis of its own normal to the direction of the belt passing over it and being small in diameter relative to the diameter of the scroll and short in axial length relative to the breadth of the belt, a plurality of such rolling members contributing to make up the breadth of the belt path.

4. A conveyer according to claim 3, comprising a first rotatable drum arrangement over and under which the upper run of belting after leaving its guide member extends and from which it is brought back as a second part of the upper run below and clear of the guide members, to receive material under conveyance thrown off the first part of the upper run as it passes over the guide member, and a second rotatable drum arrangement to which the lower run, passing back under the second part of the upper run below and past the guide members, extends and under and over which the said lower run passes, then extending back to the second guide member round which it forms a scroll or helix, and thence extending under the first part of the upper run.

5. A conveyer including an endless conveyer belt formed by rotatable drums at its terminal positions into upper and lower runs, and two guide members of cylindrical contour intermediate between the terminal positions and arranged at different levels with their axes parallel and oblique to the direction of travel of the belt passing on to them, the upper run of the belt forming a scroll or helix on the first of the two guide members to change its direction of travel, and the lower run of the belt forming a scroll or helix on the second of the guide members, the direction of travel of both runs being changed thereby through the same angle and at corresponding positions in the runs, each guide member comprising a mounting and a series of idler rolling members supported on the mounting to provide a substantially helical path for the belt, each rolling member being independently free to rotate about an axis of its own normal to the direction of the belt passing over it and being small in diameter relative to the diameter of the scroll and short in axial length relative to the breadth of the belt, a plurality of such rolling members contributing to make up the breadth of the belt path, the conveyer also including a first rotatable drum arrangement over and under which the upper run of belting after leaving its guide member extends and from which the belting is brought back as a second part of the upper run below and clear of the guide members, to receive material under conveyance thrown off the first part of the upper run as that run passes over the first guide member, and a second rotatable drum arrangement to which the lower run, passing back under the second part of the upper run and below and past the guide members, extends and under and over which second rotatable drum arrangement the said lower run passes, then extending back to the second guide member round which it forms a scroll or helix, and thence, extending under the first part of the upper run, the second guide member being located within the first guide member which is open to allow passage of the belt to and from the second guide member.

6. A conveyer including an endless conveyer belt and a guide member of cylindrical contour round which the belt runs and which lies with its axis oblique to the direction of travel of the belt passing on to it, with the belt formed into a scroll or helix on the guide member, whereby the direction of travel of the belt is changed, the guide member comprising a mounting and a series of idler axially cambered rollers supported on the mounting to provide a substantially helical path for the belt, each roller being independently free to rotate about an axis of its own normal to the direction of the belt passing over it and being small in diameter relative to the diameter of the scroll and short in axial length relative to the breadth of the belt, a plurality of such rollers contributing to make up the breadth of the belt path.

7. A conveyer including an endless conveyer belt and a guide member of cylindrical contour round which the belt runs and which lies with its axis oblique to the direction of travel of the belt passing on to it, with the belt formed into a scroll or helix on the guide member, whereby the direction of travel of the belt is changed, the guide member comprising a mounting and a series of idler rollers supported on the mounting to provide a substantially helical path for the belt, each roller being small in diameter relative to the diameter of the scroll and short in axial length relative to the breadth of the belt, a plurality of such rollers contributing to make up the breadth of the belt path, and each roller being supported on the mounting by a carrier, a carrier for each roller, which is rotatable on the mounting about a radial axis at right angles to the axis of the scroll and on which the roller in turn is freely rotatable about an axis in a plane at right angles to the said radial axis but spaced from the point of intersection of the radial axis with that plane.

GEORGE M. BUCHANAN.